United States Patent [19]

Carlson et al.

[11] Patent Number: 5,849,864
[45] Date of Patent: Dec. 15, 1998

[54] SULFONIC ACID BLOCKED METAL CATALYSTS FOR AMINE TRIGGER URETHANE REACTIONS

[75] Inventors: Gary M. Carlson, Dublin; Laurence G. Dammann, Powell, both of Ohio

[73] Assignee: Ashland Chemical Company, Dublin, Ohio

[21] Appl. No.: 686,845

[22] Filed: Aug. 1, 1996

[51] Int. Cl.⁶ .......................... C08G 18/22; C08G 18/18; C08G 18/20; C08G 18/24
[52] U.S. Cl. ..................... 528/55; 524/714; 524/717; 524/718; 524/720; 524/722; 524/723; 524/742; 524/745; 524/783; 524/784; 524/785; 528/53; 528/54; 528/56; 528/58
[58] Field of Search .................... 528/53, 54, 55, 528/56, 58; 524/714, 717, 718, 720, 722, 723, 742, 745, 783, 784, 785

[56] References Cited

U.S. PATENT DOCUMENTS

| | | | |
|---|---|---|---|
| 3,352,829 | 11/1967 | Blomeyer et al. | 528/55 |
| 3,386,980 | 6/1968 | Lal et al. | 526/95 |
| 4,322,519 | 3/1982 | Suenobu et al. | 528/58 |
| 4,574,793 | 3/1986 | Lee et al. | 528/59 |
| 4,738,991 | 4/1988 | Narayan | 528/55 |
| 4,788,083 | 11/1988 | Dammann et al. | 528/55 |
| 5,055,543 | 10/1991 | Nakano et al. | 528/58 |
| 5,089,583 | 2/1992 | Nichols et al. | 528/58 |
| 5,195,946 | 3/1993 | Li et al. | 528/53 |
| 5,478,790 | 12/1995 | Norby et al. | 528/55 |

*Primary Examiner*—Rabon Sergent
*Attorney, Agent, or Firm*—Mueller and Smith

[57] ABSTRACT

The present invention is addressed a formulation curable in the presence of an amine and containing one or more of a polyol or polymercapto resin, a polyisocyanate cross-linking agent, optionally a organic vehicle, and a tin catalyst complex. The present invention comprises the catalyst complex being formed from a metal catalyst and a complexing sulfonic acid in an equivalent ratio of complexing sulfonic acid to metal catalyst of greater than 2:1. Such curable formulation may be compounded into a coating, an adhesive (including a structural adhesive), a caulk, a foundry binder, or the like. Besides having excellent shelf life, long periods of open time are experienced with the novel catalyzed formulation. However, upon exposure to an amine, the catalyst complex becomes activated and then is effective to catalyze the NCO—OH reaction or the NCO—SH reaction to effect cure of the formulation.

8 Claims, No Drawings

SULFONIC ACID BLOCKED METAL CATALYSTS FOR AMINE TRIGGER URETHANE REACTIONS

BACKGROUND OF THE INVENTION

The present invention relates to metal catalysts useful in the cure of polyol/polyisocyanate reaction mixtures and more particularly to a one-pack or two-pack urethane reaction mixture with long shelf life or pot life, and rapid on-demand or trigger cure.

In the polyurethane coatings field, for example, catalyzed aliphatic urethane coating systems having both extended open times and fast "on demand" or "trigger" cures have been realized by the utilization of mercapto complexing agents to block the activity of a tin or bismuth catalyst. As described by Dammann, et al., in U.S. Pat. No. 4,788,083, the disclosure of which is expressly incorporated herein by reference, such complexed catalysts remain essentially inactive until unblocked in the presence of an amine catalyst or heat. Norby, et al., in U.S. Pat. No. 5,478,790, the disclosure of which is expressly incorporated herein by reference, extend the storage life of such catalyzed reaction mixtures by restricting the solvent or vehicle to a non-carbonyl vehicle that will not react with a polymercapto resin or a mercapto compound upon extended storage of the tin or bismuth based catalyst system.

Coe, in U.S. Pat. No. 4,286,073, the disclosure of which is expressly incorporated herein by reference, proposes the use of dialkyltin sulfonate catalysts. Aliphatic urethane coating systems curable with vaporous amine catalyst have been described in U.S. Pat. No. 4,517,222, the disclosure of which is expressly incorporated herein by reference, which is an improvement on so-called chamber cure systems such as described in, for example, U.S. Pat. No. 4,753,825, the disclosure of which is expressly incorporated herein by reference,. Subsequently, polymercapto resins were developed for cure with such vaporous amine catalyst method, as described in U.S. Pat. No. 4,753,825. The foregoing catalyst complexes also can be used to cure the polymercapto resins of the '825 patent. Use of polymercapto resins enables the use of all-aliphatic isocyanate curing agents and results in coatings with unusually high gloss. However, such resins actually have been found to be too reactive for commercial use.

There exists a need in the art for coatings, adhesives, and other formulations that possess long shelf life, extended pot life, and cure rapidly on demand. Such is the present invention addressed in the urethane field.

BROAD STATEMENT OF THE INVENTION

The present invention is addressed a formulation curable in the presence of an amine and containing one or more of a polyol or polymercapto resin, a polyisocyanate cross-linking agent, and a metal catalyst complex. The present invention comprises the metal catalyst complex being formed from a metal catalyst and a complexing sulfonic acid in an equivalent ratio of sulfonic acid to metal catalyst of greater than 2:1. Such curable formulation may be compounded into a coating, an adhesive (including a structural adhesive), a caulk, a foundry binder, or the like. Besides having excellent shelf life, long periods of open time are experienced with the novel catalyzed formulation. However, upon exposure to an amine, the catalyst complex becomes to effect cure of the formulation.

DETAILED DESCRIPTION OF THE INVENTION

The novel catalyst complexes of the present invention can be deemed to have been inactivated or passivated in their ability to catalyze an isocyanate/hydroxyl (or isocyanate/mercapto) reaction. Thus, shelf stability and open time of formulations containing the novel catalyst complexes mimic their uncatalyzed counterparts. Yet, upon the addition of an amine to the formulation, the catalyst complexes revert to their active state and become effective in catalyzing the formulation not unlike a counterpart catalyst not subjected to acid complexing. Unique and advantageous properties, thus, can be realized by use of the novel acid catalyst complexes disclosed herein.

Referring initially to the "metal catalysts", such catalysts are effective in catalyzing the hydroxyl/isocyanate reaction (or mercapto/isocyanate reaction). A variety of conventional tin catalysts can be used advantageously in the inventive catalyst system. Conventional tin catalysts include, for example, di-alkyl tin carboxylates such as dibutyltin dicarboxylates (e.g., dibutyltin dioctoate, stannous octoate, stannous acetate, di-n-butyl tin dilaurate, tri-n-butyl tin acetate, stannous oxylate, stannous citrate, and the like), tin mercaptides (e.g., dibutyltin dilaurylmercaptide), stannic oxide, stannous chloride, stannic chloride, tetra-phenyl tin, tetra-butyl tin, dimethyl tin dichloride, 1:1 Harada complex of a dialkyl tin dicarboxylate and a dialkyl tin oxide catalyst, and the like and even mixtures thereof.

Other metal catalysts which can be blocked effectively in accordance with the precepts of the present invention include, for example, other metal salts which are effective for the catalysis of the isocyanate/hydroxyl reaction. These metal salts include, inter alia, metal carboxylates, such as, for example, cobalt naphthenate, iron naphthenate, manganese naphthenate, zinc naphthenate, and the corresponding metal Cem-All®, metal Hex-Cem®, and metal Ten-Cem® catalysts (Mooney Chemical Co., 2301 Scranton Rd., Cleveland, Ohio 43113). Also suitable are metal acetylacetonates, such as, for example, Co(II) acetylacetonate, Co(III) acetylacetonate, manganese (II) acetylacetonate, manganese (III) acetylacetonate, zinc (II) acetylacetonate, and a variety of other acetylacetonates. Iron and zirconium acetylacetonate are particularly effective catalysts for present purposes.

Referring next to the sulfonic acids used to block the metal catalysts, sulfonic acids for present purposes are effective in complexing with metal catalysts to render them inactive or passive in an isocyanate/hydroxyl formulation. Preferable sulfonic acids include, for example, para-toluene sulfonic acid; dodecylbenzenesulfonic acid; naphthalene and substituted naphthalene sulfonic acids; alkyl sulfonic acids, such as, for example, methane sulfonic acid and disulfonic acids, such as, for example, naphthalene and substituted naphthalene disulfonic acids; and phenol and substituted phenol sulfonic acids.

Of importance in the present invention, is the use of sufficient complexing sulfonic acid such that the equivalent ratio of complexing sulfonic acid to metal catalyst is at least 2:1. At lower ratios, commercially effective blocking appears absent. While much higher ratios can be used, little benefit in stability in terms of pot life or shelf life has been observed. Thus, practical complexing sulfonic acid:metal catalyst equivalent ratios range from greater than 2:1 to about 5:1. When speaking of "metal catalyst", the amount of active metal in the catalyst is meant for present purposes, it being recognized that commercial metal catalysts have variable metal content and may contain a variety of solvents, thixotropic agents, and the like.

To make the catalyst complexes of the present invention, the ingredients simply need to be mixed, advantageously at room temperature, although higher temperatures can be used as necessary, desirable, or convenient. Use of non-keto organic vehicle as disclosed in the '790 patent may be practiced. Suitable such volatile vehicles include, for example, aromatic hydrocarbons and terpenes. Preferred such volatile vehicles include, for example, toluene, xylene, turpentine, d-limonene, aromatic petroleum distillates, and the like and mixtures thereof. Alternatively, non-volatile vehicles include, for example, polyether polyols (e.g., block polyethylene and polypropylene oxide homo- and co-polymers ranging in molecular weight from about 300 to about 3,000) optionally alkylated (e.g., polytetramethylene ether glycols), caprolactone-based polyols, and the like.

The polyisocyanate used to prepare the curable formulations of the present invention are conventional and can be chosen from a wide variety of aromatic, aliphatic, or cycloaliphatic isocyanates having, on average, two or more isocyanate groups per molecule. These polyisocyanates include, for example, methylene diphenyl isocyanate (MDI), toluene diisocyanate (TDI), xylylene diisocyanate (XDI), polyphenylene diisocyanates available commercially as, for example, Mondur MR or Mondur MRS (Bayer Corp.), isophorone diisocyanate (IPDI), hydrogenated methylene diphenyl isocyanate (HMDI), tetramethyl xylene diisocyanate (TMXDI), hexamethylene diisocyanate (HDI), or oligomer materials of these materials such as a trimer of IPDI, HDI or a biuret of HDI, and the like and mixtures thereof. Reference is made to the '222, '083, and '825 patents cited above for further discussion of such polyisocyanate compounds.

Polyols useful for inclusion with the polyisocyanates will vary depending upon the final use of the catalyzed formulations, be it coatings, adhesives, or the like, as will appropriate polyisocyanates for inclusion therewith. Representative polyether polyols include, for example, poly (alkylene oxide) polyols including poly(ethylene oxide) and poly(propylene oxide). The average number of hydroxyl groups per molecule typically is 2 or greater. The hydroxyl functionality is pendent and often is terminal (at the ends of the polymer chain) and can be either primary, as is the case with poly(ethylene oxide), or predominately secondary, as obtained in the poly(propylene oxide) based polyols. Representative examples of commercial polypropylene oxide polyols include, for example, Poly G polyols (Olin Corporation) such as Poly G 20-28, a 4000 molecular weight (MW) polypropylene oxide diol; Poly G 20-56, a 2000 MW polypropylene oxide diol; and Poly G 20-112, a 1000 MW diol. Polypropylene oxide polyols can be further reacted or "tipped" with a small amount of ethylene oxide to convert the lower reactivity secondary hydroxyl groups of the propylene glycol to more reactive primary alcohol groups. Commercial ethylene oxide "tipped" polypropylene glycols include, for example, Poly G 55-28, a 4000 MW polymer containing 30% ethylene oxide with 85% of the functional groups being primary hydroxyl groups. Higher functionality polyols include, for example, Poly G 30-28, a 6000 MW polypropylene glycol triol; and Poly G 85-26, a 6500 MW triol, having 5% ethylene oxide "capped" ends with 50% of the final hydroxyl groups present as primary hydroxyl groups.

Other polyether backbones, such as poly(tetrahydrofuran) or poly(1,2-butylene oxide) also can be used in combination with the disclosed blocked metal catalysts.

Useful polyester polyols can be obtained by reacting a dicarboxylic acid or a mixture of dicarboxylic acids with an excess of a diol to yield a hydroxyl-terminated polyester resin, for example, as obtained by the condensation of adipic acid with an excess of 1,4-butanediol. Dicarboxylic acids used include, for example, the acids: succinic, glutaric, adipic, azelaic, phthalic, and cyclohexanedicarboxylic. Acid anhydrides also can be used either alone or in combination with other dicarboxylic acids, such as, for example, maleic anhydride which is commonly used to prepare polyesters having ethylenic unsaturation. Diols used can include, for example, ethylene glycol, propylene glycol, 1,4-butanediol, 1,3-butylene glycol, 1,6-hexanediol, and neopentyl glycol. Other dicarboxylic acids and diols can be used to achieve special effects and specific properties.

Higher functionality polyester polyols can be prepared by using acids having functionalities greater than 2, such as, for example, trimellitic anhydride; or by using polyols having more than 2 hydroxyl groups, such as, for example, trimethylolethane, trimethylolpropane, pentaerythritol. Specific functional groups can be incorporated by using either functional acid (anhydride) components or functional polyol components (e.g., the use of maleic anhydride).

Additionally, the polyol can be chosen from any of a variety of solid polyols which are dispersed in the formulation resulting in a one component formulation having extended shelf life. After the product is applied, it is heated to solubilize the polyol resulting in a rapid cure. Examples of suitable solid polyols include, for example, pentaerythritol and a wide variety of insoluble carbohydrates, such as, for example, mannitol.

Representative ingredients forming the acrylic polyol resins for inclusion in the curable formulations disclosed herein include, for example, reactive vinyl monomers such as the lower alkyl esters of acrylic and methacrylic acids or polymers or prepolymers thereof. Vinyl monomers particularly adapted for copolymerization include, for example, methyl (meth)acrylate, ethyl (meth)acrylate, 2-ethyl hexyl (meth)acrylate, butyl (meth)acrylate, isobutyl (meth) acrylate; the epoxy (meth)acrylates, e.g., glycidyl (meth) acrylate. Other vinyl monomers include, for example, vinyl acetate, vinyl and vinylidene halides, N-vinyl pyrrolidone, and amides, e.g., methyl (meth)acrylamide, (meth) acrylamide, diacetone acrylamide, butadiene, styrene, vinyl toluene, and the like.

These reactive vinyl monomers are copolymerized singularly or in various combinations with hydroxyl bearing acrylates or methacrylates to produce the acrylic polyol resins. Representative hydroxyl bearing acrylates and methacrylates include: hydroxyethyl acrylate, hydroxyethyl methacrylate, hydroxypropyl acrylate, hydroxypropyl methacrylate, butane diol monoacrylate, butane diol monomethacrylate, and polycaprolactone monoacrylate. Specific preferred commercial acrylic polyol resins include, for example, Desmophen A-450 and A-160 resins available from Bayer Corp. A wide variety of additional acrylic resinous compounds may be used in accordance with the precepts of the present invention as those skilled in the art will appreciate.

Additionally, a wide variety of other polymer backbones and systems can be formulated to contain pendent hydroxyl groups for use in compounding the inventive catalyzed formulations. These include, for example, vinyls, urethanes, ureas, silicones, ureas, and the like, as those skilled in the art will appreciate.

These compositions conventionally are used as two-part compositions where the polyol and polyisocyanate components are mixed shortly before use. The blocked catalyst prevents the immediate reaction resulting in long pot lives during which time the composition retains its processability.

On application of the amine trigger, the metal catalyst is deblocked an begins catalyzing the cure. By careful choice of the levels of metal catalyst and the types of polyols and polyisocyanates, its is possible to develop formulations which have very long pot lives, but which also possess very fast cure times once activated by the amine trigger.

With respect to the proportions of catalyst system, the proportion of metal catalyst should be adjusted to be in an effective catalytic amount for the polyovpolyisocyanate reaction. Typically, this translates into active metal catalyst concentration levels ranging from about 0.0001 to about 1.0 weight percent. The proportion of complexing sulfonic acid generally is adjusted to be in excess of the metal catalyst by an equivalent ratio of greater than 2:1. Sulfonic acid/catalyst equivalent ratios will vary depending upon the particular metal catalyst, the particular sulfonic acid complexing agent, the polyol and polyisocyanate of choice, and the performance requirements desired.

Cure of the catalyzed polyurethane-forming reaction mixtures can be accomplished by use of amine activators as detailed in the '083 patent with tertiary amines being preferred for their catalytic activity without becoming reactive in the formulation. Representative preferred amines include, for example, trialkyl amines, such as, for example, trimethyl amine, triethyl amine, tri-n-propyl amine, tri-iso-propyl amine, tributyl amine, methyldiethyl amine, dimethylethyl amine, and dimethylcyclohexyl amine; and alkanolamines, such as, for example, methyldiethanol amine, dimethyletha-nol amine, and triethanol amine. Other effective amines include, for example, benzyldimethyl amine, bis (dimethylamino ethyl) ether, N-methyl morpholine, triethylene diamine, hexamethylene tetramine, and N,N,N',N'-tetramethyl ethylene diamine.

Substrates to be coated and techniques for substrate coating and cure also are well known in this art. Additionally, formation of adhesives (including structural adhesives), caulking compounds, foundry binders, and wide variety of additional curable products can be made in accordance with the precepts of the present invention. In this regard in adhesives use, the long open times realizable with the inventive catalyst complexes translate into the ability for the adhesives to be left in contact with difficult to wet substrates (e.g., wood) for a longer period of time which can be a definite benefit in joining substrates, be they wood, plastic, reinforced plastic, metal, etc.

Additionally, conventional additives may be incorporated into the catalyzed formulations, including, for example, depending upon use, wetting agents, plasticizers, rheology control agents, pigments, tackifiers, antioxidants, ultraviolet absorbers, antistatic agents, lubricants, fillers, opacifying agents, anti-foam agents, and the like and mixtures thereof. In adhesives use, the adhesives may be applied to one or both sides of the substrate in a conventional manner, for example, by spraying, knife coating, bead dispensing, roller coating, casting, drum coating, dipping, and the like. In coatings use, similar application techniques also are used.

The following examples show how the present invention can be practiced, but should not be construed as limiting. In this application, all proportions and percentages are by weight and all units are in the metric system, unless otherwise expressly noted. Also, all citations are expressly incorporated herein by reference.

EXAMPLES

Example I

Cure rates were measured by placing a thin film of the sample on a sodium chloride crystal and placing it is a Nicolet P510 Fourier Transform Infrared Spectrometer. A spectrum was collected by co-adding 32 scans at resolution 8 cm$^{-1}$. The conversion curve was calculated from the ratio of the height of the isocyanate absorbence at 2280 cm$^{-1}$ to the absorbence due to C—H bonds at 2971 cm$^{-1}$. This ratio was used to correct for any changes in sample thickness which occur during the reaction—the absorbence due to C—H bonds should not change during the cure reaction. The conversion curve was calculated assuming the first spectrum represented no reaction and complete reaction would be indicated by the disappearance of the absorbence at 2280 cm$^{-1}$, using the following equation:

Conversion=[Ratio (0)–Ratio (t)]*100/Ratio (0), where, Ratio (0) is the initial ratio and Ratio (t) is the ratio at time, t.

A series of reaction mixtures were prepared as follows:

TABLE I

| Ingredient | Control | Catalyst A | Catalyst B | Catalyst C | Catalyst D |
|---|---|---|---|---|---|
| T-12* | 0.5 | 0.5 | 0.5 | 0.5 | 0.5 |
| Witco Soft Acid** | — | 0.1 | 0.25 | 0.5 | 1.0 |
| Toluene | 2.5 | 2.4 | 2.25 | 2.0 | 1.5 |
| WSA:Sn Ratio | 0 | 0.4:1 | 1:1 | 2:1 | 4:1 |

*Dabco T-12 brand of tin catalyst, Air Products Inc.
**Witco 1298 Soft Acid, dodecylbenzene sulfonic acid, Witco Corp.

A mixture of 1.7 g of Rubinate 9272 MDI (modified diphenylmethane diisocyanate, NCO eq. wt. 525, NCO Content 8%, viscosity @ 25° C. 3000 cps, pale yellow liquid, functionality of 2.0, sp. gravity @ 25° C. of 1.2, supplied by ICI Americas Inc., Sterling Heights, Mich.), and 3.3 g of Poly-G 20-56 polyether polyol (2000 avg. MW, 87 avg. OH no. (mg KOH/g), 0.01 wt-% water, 0.05 acid number (mg KOH/g) APHA color of 10, 6.8 avg. pH in 10/6 isopropanol/water, 3.22 cps typical viscosity @25° C., 1.001 sp. gravity @ 25° C., supplied by Olin Corporation, Stamford, Conn.) was mixed and three drops of catalyst solution added. The catalyst was stirred into the sample and a conversion curve obtained using the FT-IR technique with the following data being recorded.

TABLE II

| Time (min) | Control | Catalyst A | Catalyst B | Catalyst C | Catalyst D |
|---|---|---|---|---|---|
| 5.2 | 17.00 | 17.32 | 18.28 | 1.14 | 0.72 |
| 10.2 | 30.07 | 31.32 | | | |
| 15.2 | 39.84 | 42.06 | 44.84 | 2.59 | 1.68 |
| 20.2 | 47.20 | 50.10 | 53.55 | 3.10 | 2.24 |
| 25.2 | 52.97 | 56.14 | 60.03 | 3.84 | 2.74 |
| 30.2 | 57.50 | 60.76 | 64.83 | 4.60 | 3.25 |
| 35.2 | 60.92 | 64.20 | 68.40 | 5.33 | 3.74 |
| 40.2 | 63.66 | 66.85 | 70.97 | 5.83 | 4.24 |
| 45.2 | 65.87 | 68.89 | 73.00 | 6.60 | 4.84 |
| 50.2 | 67.71 | 71.08 | 74.51 | 7.32 | 5.23 |
| 55.2 | 69.11 | 71.81 | 75.80 | 7.82 | 5.61 |
| 60.2 | 70.29 | 72.84 | 76.74 | 8.58 | 6.12 |
| 65.2 | 71.24 | 73.64 | 77.48 | 9.09 | 6.53 |
| 70.2 | 71.98 | 74.37 | 78.06 | 9.60 | 6.96 |
| 75.2 | 72.69 | 74.96 | 78.66 | 10.36 | 7.35 |
| 80.2 | 73.24 | 75.43 | 79.03 | 11.07 | 7.69 |
| 85.2 | 73.6 | 75.81 | 79.40 | 11.57 | 8.09 |
| 90.2 | 74.18 | 76.18 | 79.73 | 12.33 | 8.55 |
| 95.2 | 74.53 | 76.51 | 80.03 | 12.84 | 8.96 |

It can be seen that the reaction rates of Catalysts A and B (molar ratios of acid:tin of 0.4:1 and 1:1, respectively) are roughly the same as the reaction rate in the presence of unblocked catalyst. Thus, the amount of complexing or blocking acid had little effect on the reaction rate of the system.

At an acid:tin molar ratio of 2:1, however, the rate of reaction decreased drastically, as can be observed from the reaction rates for Catalyst C. However, an increase in the acid:tin molar ratio of 4:1 in Catalyst D reduced the reaction rate only slightly over that seen for Catalyst C.

Example II

A solution of blocked catalyst was prepared from 0.5 g of Dabco T-12 tin catalyst and 1.0 g of Witco Soft Acid in 1.5 g of toluene. A solution of 0.5 g of Dabco T-12 catalyst in 2.5 g of toluene was used as a control solution of the unblocked catalyst.

The effect of the catalyst solutions was tested by adding 3 drops of each catalyst to a mixture of 1.7 g of Rubinate 9272 MDI and 3.3 g of Poly G 20-56 polyether polyol. The data recorded is set forth below:

TABLE III

| Time (min) | Control | Blocked Catalyst + Amine | Blocked Catalyst |
|---|---|---|---|
| 1.15 | 5.97 | 12.73 | 0.51 |
| 2.10 | 28.94 | 44.11 | 0.97 |
| 3.05 | 54.50 | 69.16 | 1.59 |
| 4.00 | 68.97 | 78.05 | 2.24 |
| 4.95 | 75.61 | 81.71 | 3.01 |
| 5.90 | 78.92 | 83.74 | 3.92 |
| 6.85 | 89.89 | 85.38 | 4.68 |
| 7.80 | 82.11 | 86.71 | 5.44 |
| 8.75 | 83.20 | 88.10 | 6.16 |
| 9.70 | 83.94 | 89.19 | 7.10 |
| 10.65 |  | 90.27 | 7.95 |
| 11.60 |  | 91.18 | 8.55 |
| 12.55 |  | 92.11 | 9.30 |
| 13.50 |  | 92.87 | 10.19 |
| 14.45 |  | 93.62 | 10.91 |
| 15.40 |  | 94.20 | 11.66 |
| 16.35 |  | 94.79 | 12.37 |
| 17.30 |  | 95.46 | 12.95 |
| 18.25 |  | 95.96 | 13.67 |

It will be observed that the unblocked (Control) catalyst shows an immediate fast reaction between the isocyanate and the polyol, while the blocked catalyst shows a very slow reaction. The addition of 3 drops of dimethylethanolamine to the system having the blocked catalyst, however, activates the catalyst to give a conversion curve very similar to that of the unblocked catalyst itself.

Example III

Catalyst solutions were prepared by adding 0.25 g of the desired metal acetylacetonate (AcAc) to 2.75 g of N-methylpyrrolidone solvent. Blocked catalyst solutions were prepared using 0.25 g metal catalyst, 0.50 g Witco 1298 Soft Acid (dodecylbenzene sulfonic acid), and 2.25 g N-methylpyrrolidone. An uncatalyzed polyol/polyisocyanate master mixture was prepared by adding 68.9 g Rubinate 9272 and 131.1 g Poly G 30-56 (3000 MW poly(propylene oxide) triol). To 5 g of the master mixture was added 6 drops of catalyst solution and when required 2 drops of dimethylethanolamine. Gel times were visually determined at ambient temperature. The results recorded are displayed in Table IV below.

TABLE IV

| Catalyst | Gel Time Unblocked Catalyst | Gel Time Blocked Catalyst | Gel Time Blocked Catalyst + Amine |
|---|---|---|---|
| Fe (III) AcAc | 109 min. | Ungelled at 8 hrs. | 35 min. |
| Zr (IV) AcAc | 83 min. | Ungelled at 8 hrs. | 17 min. |
| Co (II) AcAc | Almost gelled at 8 hrs. | Thin at 8 hrs. | Gelled at 8 hrs. |
| Ni (II) AcAc | Moderately thick at 8 hrs. | Thin at 8 hrs. | Thick at 8 hrs. |
| V (III) AcAc | Thick at 8 hrs. | Thin at 8 hrs. | Almost gelled at 8 hrs. |

While not all catalysts tested are as effective as are other catalysts in promoting the hydroxy/isocyanate reaction, the above-tabulated results clearly demonstrate the inhibiting effect which the sulfonic acid blocking agent has on the metal catalysts and the promoting or trigger effect which the amine has on the blocked catalysts. Again, the precepts of the present invention are demonstrated.

We claim:

1. In a formulation curable with amine catalyst and containing one or more of a polyol or polymercapto resin, a polyisocyanate cross-linking agent, and a metal catalyst complex, the improvement which comprises said catalyst complex formed from said metal catalyst and a complexing sulfonic acid in an equivalent ratio of complexing sulfonic acid to metal catalyst of greater than 2:1.

2. The formulation of claim 1, wherein said complexing acid is one or more of para-toluene sulfonic acid; dodecylbenzenesulfonic acid; naphthalene sulfonic acids; methane sulfonic and disulfonic acids; naphthalene disulfonic acids; and phenol sulfonic acids.

3. The formulation of claim 1, wherein said metal catalyst is one or more of di-alkyl tin carboxylates, tin mercaptides, stannic oxide, dibutyl tin dichloride, dimethyl tin dichloride, and 1:1 Harada complex of a dialkyl tin dicarboxylate and a dialkyl tin oxide catalyst; cobalt naphthenate, iron naphthenate, manganese naphthenate, zinc naphthenate, iron acetylacetonate, zirconium acetylacetonate, Co(II) acetylacetonate, Co(III) acetylacetonate, manganese(II) acetylacetonate, manganese (III) acetylacetonate, zinc (II) acetylacetonate; and mixtures thereof.

4. The formulation of claim 1, wherein said amine is one or more of trimethyl amine, triethyl amine, tri-n-propyl amine, tri-iso-propyl amine, tributyl amine, methyldiethyl amine, dimethylethyl amine, dimethylcyclohexyl amine, methyldiethanol amine, dimethylethanol amine, triethanol amine, benzyldimethyl amine, bis(dimethylamino ethyl) ether, N-methyl morpholine, triethylene diamine, hexamethylene tetraamine, N,N,N'N'-tetramethyl ethylene diamine, and mixtures thereof.

5. A method for making a formulation curable with amine and containing one or more of a polyol or polymercapto resin, a polyisocyanate cross-linking agent, and a metal catalyst complex, the improvement which comprises said catalyst complex formed from said metal catalyst and a complexing sulfonic acid in an equivalent ratio of complexing sulfonic acid to metal catalyst of greater than 2:1.

6. The formulation of claim 5, wherein said complexing acid is one or more of para-toluene sulfonic acid; dodecylbenzenesulfonic acid; naphthalene sulfonic acids; methane sulfonic acids and disulfonic acids; naphthalene disulfonic acids; and phenol sulfonic acids.

7. The method of claim 5, wherein said metal catalyst is one or more of di-alkyl tin carboxylates, tin mercaptides, stannic oxide, dibutyl tin dichloride, dimethyl tin dichloride, and 1:1 Harada complex of a dialkyl tin dicarboxylate and a dialkyl tin oxide catalyst; cobalt naphthenate, iron naphthenate, manganese naphthenate, zinc naphthenate, iron acetylacetonate, zirconium acetylacetonate, Co(II) acetylacetonate, Co(III) acetylacetonate, manganese(II) acetylacetonate, manganese (III) acetylacetonate, zinc (II) acetylacetonate; and mixtures thereof.

8. The method of claim 5, wherein said amine is one or more of trimethyl amine, triethyl amine, tri-n-propyl amine, tri-iso-propyl amine, tributyl amine, methyldiethyl amine, dimethylethyl amine, dimethylcyclohexyl amine, methyldiethanol amine, dimethylethanol amine, triethanol amine, benzyldimethyl amine, bis(dimethylamino ethyl) ether, N-methyl morpholine, triethylene diamine, hexamethylene tetraamine, N,N,N'N'-tetramethyl ethylene diamine, and mixtures thereof.

* * * * *